US009767355B2

(12) United States Patent
Wang et al.

(10) Patent No.: US 9,767,355 B2
(45) Date of Patent: Sep. 19, 2017

(54) COMPARING EXTRACTED CARD DATA USING CONTINUOUS SCANNING

(71) Applicant: GOOGLE INC., Mountain View, CA (US)

(72) Inventors: Xiaohang Wang, Millburn, NJ (US); Marcus Quintana Mitchell, New York, NY (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 15/461,180

(22) Filed: Mar. 16, 2017

(65) Prior Publication Data

US 2017/0185837 A1    Jun. 29, 2017

Related U.S. Application Data

(63) Continuation of application No. 15/184,198, filed on Jun. 16, 2016, which is a continuation of application
(Continued)

(51) Int. Cl.
G06K 9/00    (2006.01)
G06K 9/34    (2006.01)
(Continued)

(52) U.S. Cl.
CPC ......... G06K 9/00483 (2013.01); G06K 9/344 (2013.01); G06K 9/78 (2013.01);
(Continued)

(58) Field of Classification Search
CPC .... G06K 9/18; G06K 9/2054; G06K 9/00469; G06K 9/228; G06K 9/6201;
(Continued)

(56) References Cited

U.S. PATENT DOCUMENTS 6,466,253 B1    10/2002  Honjoh
6,527,173 B1 *   3/2003  Narusawa ............ G06K 19/077
                                                    235/380
(Continued)

FOREIGN PATENT DOCUMENTS

WO    2014/210577 A2    12/2014
WO    2014/210577 A3    2/2015

OTHER PUBLICATIONS

Aguilar, "European Office Action issued in European Application No. 14747437.3", mailed on Nov. 11, 2016, 7 pages.
(Continued)

Primary Examiner — Yon Couso
(74) Attorney, Agent, or Firm — Johnson, Marcou & Isaacs, LLC

(57) ABSTRACT

Comparing extracted card data from a continuous scan comprises receiving, by one or more computing devices, a digital scan of a card; obtaining a plurality of images of the card from the digital scan of the physical card; performing an optical character recognition algorithm on each of the plurality of images; comparing results of the application of the optical character recognition algorithm for each of the plurality of images; determining if a configured threshold of the results for each of the plurality of images match each other; and verifying the results when the results for each of the plurality of images match each other. Threshold confidence level for the extracted card data can be employed to determine the accuracy of the extraction. Data is further extracted from blended images and three-dimensional models of the card. Embossed text and holograms in the images may be used to prevent fraud.

17 Claims, 8 Drawing Sheets

Related U.S. Application Data

No. 14/447,072, filed on Jul. 30, 2014, now Pat. No. 9,390,419, which is a continuation of application No. 14/026,479, filed on Sep. 13, 2013, now Pat. No. 8,805,125.

(60) Provisional application No. 61/841,273, filed on Jun. 28, 2013.

(51) Int. Cl.
*G06T 17/00* (2006.01)
*G06K 9/78* (2006.01)
*G06Q 20/32* (2012.01)
*G06Q 20/34* (2012.01)

(52) U.S. Cl.
CPC ........... *G06Q 20/327* (2013.01); *G06Q 20/34* (2013.01); *G06T 17/00* (2013.01); *G06K 2209/01* (2013.01)

(58) Field of Classification Search
CPC .................. G06K 9/6202; G06K 9/78; G06K 2009/2045; G06K 9/00483; G06K 9/344; G06K 2209/01; G06Q 20/322; G06Q 20/34; G06Q 20/4016; G06T 17/00
See application file for complete search history.

(56) References Cited

U.S. PATENT DOCUMENTS

| | | | |
|---|---|---|---|
| 6,782,144 | B2 | 8/2004 | Bellavita et al. |
| 7,257,589 | B1 | 8/2007 | Hull et al. |
| 8,805,125 | B1 | 8/2014 | Kumar et al. |
| 8,890,978 | B1 | 11/2014 | Madhani et al. |
| 9,390,419 | B2 | 7/2016 | Kumar et al. |
| 2003/0142855 | A1 | 7/2003 | Kuo et al. |
| 2005/0129282 | A1* | 6/2005 | O'Doherty ............. G07D 7/121 382/112 |
| 2006/0131389 | A1* | 6/2006 | Kwon .................... G07D 7/004 235/380 |
| 2007/0065002 | A1 | 3/2007 | Marzell et al. |
| 2011/0288909 | A1 | 11/2011 | Hedley et al. |
| 2012/0087537 | A1 | 4/2012 | Liu et al. |
| 2012/0099780 | A1 | 4/2012 | Smith et al. |
| 2012/0143760 | A1 | 6/2012 | Abulafia et al. |
| 2012/0239542 | A1 | 9/2012 | Preston et al. |
| 2012/0330447 | A1 | 12/2012 | Gerlach et al. |
| 2013/0120595 | A1 | 5/2013 | Roach et al. |
| 2014/0052636 | A1 | 2/2014 | Mattes |
| 2014/0112526 | A1 | 4/2014 | Kim et al. |
| 2015/0006360 | A1 | 1/2015 | Kumar et al. |
| 2015/0006361 | A1 | 1/2015 | Kumar et al. |
| 2015/0006387 | A1 | 1/2015 | Wang et al. |
| 2016/0132885 | A1 | 5/2016 | Kumar et al. |
| 2016/0292527 | A1 | 10/2016 | Kumar et al. |

OTHER PUBLICATIONS

Couso, U.S. Office Action issued in copending U.S. Appl. No. 14/026,479, filed Sep. 13, 2013, mailed on Jan. 6, 2014, 8 pages.
Couso, U.S. Office Action issued in copending U.S. Appl. No. 14/447,072, filed Jul. 30, 2014, mailed on Dec. 1, 2015, 12 pages.
Couso, Office Action issued in copending U.S. Appl. No. 15/184,198, filed Jun. 16, 2016 mailed on Aug. 2, 2016, 10 pages.
Couso, U.S. Office Action issued in copending U.S. Appl. No. 15/184,198, filed Jun. 16, 2016 mailed on Jan. 4, 2017, 7 pages.
Datta, "Credit Card Processing Using Cell Phone Images", Jan. 1, 2011, 7 pages.
Getachew, U.S. Office Action issued in copending U.S. Appl. No. 14/026,781, filed Sep. 13, 2013 mailed on Oct. 12, 2016, 13 pages.
Google, "Understanding Optical Character Recognition (OCR)", Jan. 1, 2002, 7 pages.
Jacob, "Identification Numbers and Check Digit Algorithms", Sep. 20, 2012, 11 pages.
Lopresti, et al., "Using Consensus Sequence Voting to Correct OCR Error", vol. 67, No. 1, Jul. 1, 1997, 9 pages.
Mohri, "International Preliminary Report on Patentability issued in International Application No. PCT/US2014/044758 mailed on Jan. 7, 2016, 14 pages".
Neubig, U.S. Office Action issued in copending U.S. Appl. No. 14/026,738, filed Sep. 13, 2013 mailed on Nov. 16, 2016, 22 pages.
Neubig, U.S. Office Action issued in copending U.S. Appl. No. 14/026,738, filed Sep. 13, 2013, mailed on May 4, 2016, 25 pages.
Neubig, U.S. Office Action issued in copending U.S. Appl. No. 14/037,063, filed Sep. 25, 2013, mailed on Jun. 7, 2016, 15 pages.
Neubig, U.S. Office Action issued in copending U.S. Appl. No. 14/037,063, filed Sep. 25, 2013 mailed on Dec. 14, 2016, 38 pages.
Nicomsoft, "Optical Character Recognition (OCR)—How it work", Feb. 5, 2012, 2 pages.
Sprague, et al., "Autonomous Repair of Optical Character Recognition Data Through Simple Voting and Multi-Dimensional Indexing Technique", Dec. 31, 2005, 173 pages.
Tschubel, "International Search Report and Written Opinion issued in International Application No. PCT/US2014/044758", mailed on Jan. 7, 2015, 19 pages.
Wikipedia, "Image Scanner", Jun. 24, 2013, 12 pages.
Getachew, U.S. Office Action issued in copending U.S. Appl. No. 14/026,781, filed Sep. 13, 2013 mailed on Apr. 20, 2017, 12 pages.
U.S. Appl. No. 14/026,479 to Kumar et al., filed Sep. 13, 2013.
U.S. Appl. No. 14/026,738 to Kumar et al., filed Sep. 13, 2013.
U.S. Appl. No. 14/026,781 to Kumar et al., filed Sep. 13, 2013.
U.S. Appl. No. 14/037,063 to Wang et al., filed Sep. 25, 2013.
U.S. Appl. No. 14/447,072 to Kumar et al., filed Jul. 30, 2014.
U.S. Appl. No. 15/184,198 to Kumar et al., filed Jun. 16, 2016.
Couso, "U.S. Office Action issued in copending U.S. Appl. No. 15/184,198 filed on Jun. 16, 2016", dated Jun. 16, 2017, 9 pages.

* cited by examiner

COMPARING EXTRACTED CARD DATA USING CONTINUOUS SCANNING

REFERENCE TO RELATED APPLICATIONS

This application is a continuation of and claims priority to U.S. patent application Ser. No. 15/184,198, filed Jun. 16, 2016 and entitled "Comparing Extracted Card Data Using Continuous Scanning," which is a continuation of and claims priority to U.S. patent application Ser. No. 14/447,072, filed Jul. 30, 2014 and entitled "Comparing Extracted Card Data Using Continuous Scanning," which is a continuation of and claims priority to U.S. patent application Ser. No. 14/026,479, filed Sep. 13, 2013 and entitled "Comparing Extracted Card Data Using Continuous Scanning," which claims priority under 35 U.S.C. §119 to U.S. Provisional Application No. 61/841,273 filed Jun. 28, 2013 and entitled "Comparing Extracted Card Data Using Continuous Scanning." The entire contents of the above-identified applications are hereby fully incorporated herein by reference.

TECHNICAL FIELD

The technology disclosed herein pertains to extracting financial card information, and more particularly to using continuous card scanning to improve accuracy and to prevent fraud.

BACKGROUND

When consumers make online purchases or purchases using mobile devices, they are often forced to enter credit card information into the mobile device for payment. Due to the small screen size and keyboard interface on a mobile device, such entry is generally cumbersome and prone to errors. Users may use many different cards for purchases, such as credit cards, debit cards, stored value cards, and other cards. Information entry difficulties are multiplied for a merchant attempting to process mobile payments on mobile devices for multiple transactions.

Current applications for obtaining payment information or other card data from a payment card require a precise positioning of the card in the scan. Typically, a box is presented on the user interface of the user computing device. The user is required to precisely line the card up with the box to allow the user computing device to capture an image of the card.

Current applications do not allow continuous scans, multiple image blending, and three-dimensional models of the card to be used for more accurate results and for fraud prevention.

SUMMARY

The technology of the present disclosure includes computer-implemented methods, computer program products, and systems to compare extracted card data from a continuous scan. Comparing extracted card data comprises receiving, by one or more computing devices, a digital scan of a card; obtaining a plurality of images of the card from the digital scan of the physical card; performing an optical character recognition algorithm on each of the plurality of images; comparing results of the application of the optical character recognition algorithm for each of the plurality of images; determining if a configured threshold of the results for each of the plurality of images match each other; and verifying the results when the results for each of the plurality of images match each other. Threshold confidence level for the extracted card data can be employed to determine the accuracy of the extraction. Data is further extracted from blended images and three-dimensional models of the card. Embossed text and holograms in the images may be used to prevent fraud.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
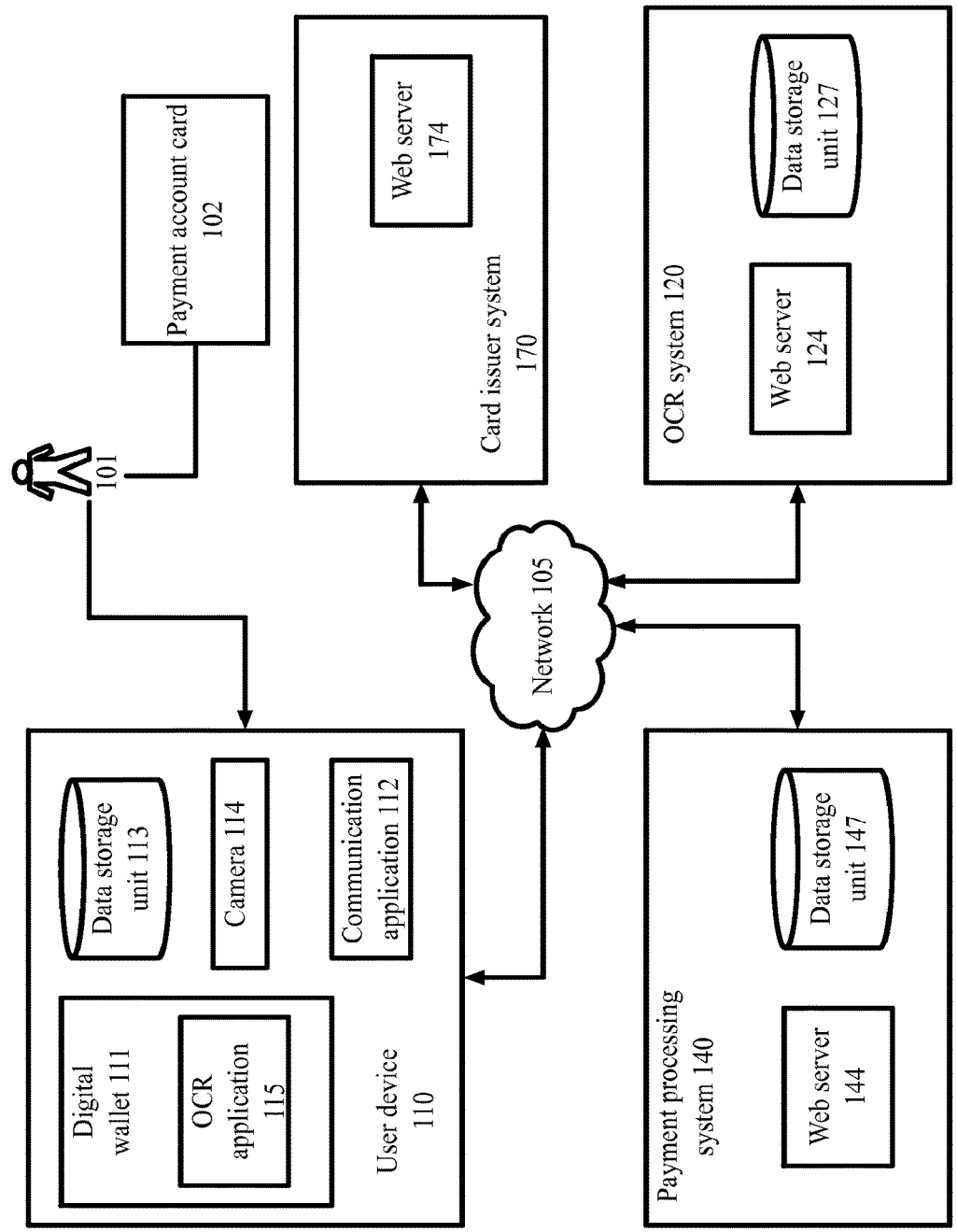
FIG. 1 is a block diagram depicting a system for extracting financial account information from a card, in accordance with certain example embodiments of the technology disclosed herein.

Embodiments herein provide computer-implemented techniques for allowing a user device to extract financial card information using optical character recognition ("OCR"). The process of extracting financial card information may be improved by using image recognition of multiple images. The OCR application may compare multiple images and determine if the digits extracted from the multiple images match. The OCR application may determine a confidence level of a first image and determine if the confidence level exceeds a configured threshold. The procedure may be repeated with additional images until a set of results exceeds the configured threshold. The OCR application may blend multiple images into a blended image that provides higher resolution and thus more accurate digit extraction. Multiple images of the card may be used to create a three-dimensional ("3D") model of the card. The OCR application may use the 3D model to more accurately extract the digits. The 3D model may also be used to prevent fraud. For example, the OCR application may verify the appearance of a hologram from various perspectives in the 3D model. A fraudulent representation of a card will not provide an accurate hologram appearance.

Throughout the specification, the general term "card" will be used to represent any type of physical card instrument, such as a magnetic stripe card. In example embodiments, the different types of card represented by "card" can include credit cards, debit cards, stored value cards, loyalty cards, identification cards, or any other suitable card representing an account or other record of a user or other information thereon. Example embodiments described herein may be applied to the images of other items, such as receipts, boarding passes, tickets, and other suitable items. The card may also be an image or facsimile of the card. For example, the card may be a representation of a card on a display screen or a printed image of a card.

The user may employ the card when making a transaction, such as a purchase, ticketed entry, loyalty check-in, or other suitable transaction. The user may obtain the card information for the purpose of importing the account represented by the card into a digital wallet application module or for other digital account purposes. The card is typically a plastic card containing the account information and other data on the card. In many card embodiments, the customer name, expiration date, and card numbers are physically embossed on the card. The embossed information is visible from both the front and back of the card, although the embossed information is typically reversed on the back of the card.

A user may desire to enter the information from the card into a mobile user computing device or other computing device, for example, to conduct an online purchase, to conduct a purchase at a merchant location, to add the information to a wallet application on a user computing device, or for any other suitable reason. In an example, the user desires to use a mobile user computing device to conduct a purchase transaction using a digital wallet application module executing on the mobile user computing device. The digital wallet application module may require an input of the details of a particular user payment account to conduct a transaction with the particular user payment account or to set up the account. Due to the small screen size and keyboard interface on a mobile device, such entry can be cumbersome and error prone. Additionally, a merchant system may need to capture card information to conduct a transaction or for other reasons.

In addition to account identifiers, the front of the card typically contains logos of the issuer of the card, pictures chosen by the user or the issuer, other text describing the type or status of the user account, a security code, and other marketing and security elements, such as holograms or badges. The user name, card expiration date, and the account identifier, such as a credit card number, may be embossed on the front of the card such that the information protrudes from the front of the card.

The user employs a mobile phone, digital camera, or other user computing device to capture a scan of the card associated with the account that the user desires to input into the user computing device.

An OCR application on the user computing device receives a scan of the card. The scan, or digital scan, may be a video of the card, a series of images of the card, or data from any other suitable scanning technology. The image may be obtained from the camera module of a user computing device, such as the camera on a mobile phone. The images may be obtained from any digital image device coupled to the user computing device or any other suitable digital imaging device. The images may be accessed by the OCR application on the user computing device from a storage location on the user storage device, from a remote storage location, or from any suitable location. All sources capable of providing the image will be referred to as a "camera."

An OCR application receives the images of the card from the camera. The functions of the OCR application may be performed by any suitable module, hardware, software, or application operating on the user computing device. Some, or all, of the functions of the OCR application may be performed by a remote server or other computing device, such as the server operating in an OCR system. For example, a digital wallet application module on the user computing device may obtain the images of the card and transmit the images to the OCR system for processing. In another example, some of the OCR functions may be conducted by the user computing device and some by the OCR system or another remote server. Examples provided herein may indicate that many of the functions are performed by an OCR application on the user computing device, but some or all of the functions may be performed by any suitable computing device.

The image of the card is presented on the user interface of the user computing device as a live video image of the financial card. The OCR application can isolate and store one or more images from the video feed of the camera. The OCR application may store a scan of the card as a video or other suitable format comprising multiple images of the card. For example, the user may hover the camera function of a user computing device over a financial card and observe the representation of the financial card on the user interface of the user computing device. The user may actuate a real or virtual button on the user computing device to capture a preferred image or group of images. The OCR application may select the preferred images automatically.

In certain examples, some or all of the functions described are performed while the scan is active. For example, the user may hover the camera of a user computing device over the card and the methods described herein are performed with live images of the card. That is, the OCR application captures and utilizes images from the active feed of the camera.

The OCR application, the camera module, or the user computing device, or other computing device performs blur detection on the images. The image may be recognized as blurry, overly bright, overly dark, or otherwise obscured in a manner that prevents a high resolution image from being obtained. The OCR application, or other function of the user computing device or the camera, may adjust the image capturing method to reduce the blur in the image. For example, the OCR application may direct the camera to adjust the focus on the financial card. In another example, the OCR application may direct the user to move the camera closer to, or farther away from, the financial card. In another example, the OCR application may perform a digital image manipulation to remove the blur. Any other method of correcting a blurred image can be utilized.

The OCR application isolates the boundaries of the card or otherwise isolates the images. The OCR application can use any image data manipulation or image extraction to isolate the card in the images.

In an example embodiment, the OCR application isolates a set of images for comparison. The number of images used may vary based on available processing capabilities, user preference, image resolution, or any suitable factor.

The OCR application may crop the images to display only the desired information from the card. In an example, if the card in the image is a credit card, the OCR application accesses information associated with the expected location of the account number of a credit card. The expected location may be obtained from a database of card layouts stored on the user computing device or in another suitable location. For example, credit cards, driver's licenses, loyalty cards, and other cards typically meet an industry standard for the data locations and the layout of the card. The industry standards may be stored in the OCR application or in a location accessible by the OCR application.

The OCR application applies an OCR algorithm to the card image to identify the information on the card. The information may be digits, characters, or other data or information. Each instance of information will be referred to as a "digit." The OCR algorithm may represent any process, program, method, or other manner of recognizing the digits represented on the card image. The OCR application extracts the digits and may display the extracted digits on the user interface of the user computing device. The OCR application may categorize groups of digits into categories such as account numbers, user name, expiration date, card issuer, or other suitable data. The OCR application may categorize the groups of digits by comparing the formats of groups of digits to a database of formats. For example, if the results of the OCR algorithm on a group of digits is "10/15", then the OCR application may interpret the format as being associated with an expiration date.

The OCR application compares the results from applying the OCR algorithm to each of the images. The OCR application determines if the results match. For example, the OCR application may compare the results for each category and determine if the same digits were produced for each category. For example, if the user name is determined to be "John D Smith" in each of the images, then the OCR application determines that the name is correctly extracted. The OCR application may compare the results for every digit or group of digits on the images. The OCR application may compare the results for a configured number of images. For example, the OCR application may compare the results for 3 or 4 images from the scan of the card. Any suitable number of images may be compared based on user preference, OCR application capabilities, user computing device processing capacity, time restraints, or any other suitable limiting factor.

The user, the OCR application, or another suitable party may set a threshold percentage of the results that must match for the information to be accepted. For example, if 3 of the 4 results indicate that the user name is "John Smith," but a single result indicated that the user name was "Jahn Smith," then the OCR application may determine that 3 out of 4 is sufficient to declare a match. Alternatively, the OCR application may require that all digits on all images match.

If the comparison indicates that the results of the OCR algorithm on each of images are the same, then the OCR application determines that the results are accurate. If the comparison indicates that the results are different for at least one of the images, then the OCR application may reject the results, apply the OCR algorithm to the images again, or obtain additional images.

For example, the OCR application may access additional images from the scan stored in the user computing device or in another suitable location. In another example, the OCR application may scan the card again and capture additional images for analysis. Any other suitable method may be utilized to obtain additional images. The OCR application may use the same number of images for the subsequent comparison or the OCR application may change the number of images analyzed.

The OCR application applies the OCR algorithm to the new images or reapplies the OCR algorithm to the previous images. The OCR application may continue the process of comparing the results of the OCR algorithm until a set of results match. The OCR application may repeat the method described herein for a configured number of attempts. For example, the OCR application may attempt to obtain matching results for 2 or 3 additional sets of images. The OCR application may then reject the results or provide further instructions to the user.

The OCR application supplies the extracted data to a digital wallet application module, point of sale terminal, payment processing system, website, or any suitable application or system that the user desires. The extracted data may be used by an application on the user computing device. The extracted data may be transmitted via an Internet connection over the network, via a near field communication ("NFC") technology, emailed, texted, or transmitted in any suitable manner.

In another example embodiment, the OCR application isolates a first image from the scan of the card. The OCR application may select an image that is determined to be the least blurry, the most bright, or in any suitable manner is a preferred image. The user may select the first image. Any other manner of selecting the first image can be utilized.

The OCR application applies an OCR algorithm to the card image to identify the information on the card as described herein.

The OCR application determines the confidence level of the results of the OCR algorithm. Any manner of assessing a confidence level may be used. For example, the OCR application may use a machine learning algorithm to determine the likelihood that a digit is correct. The machine learning algorithm may be updated with some or all of the verifications or revisions of the results by the user.

In an example, the OCR application may determine the confidence level for each digit by determining the difference in the confidence level between the top two digit candidates. That is, the OCR application may determine that a digit meets many of the characteristics of a "1" and assess a score to a particular digit of 80%. The OCR application may determine that the same digit meets many of the characteristics of a "7" and assess a score to a particular digit of 60%. Then, the OCR application may assess a particular confidence level based on the difference between the two digit scores.

The OCR application may determine the confidence level for all of the data on the card based on the confidence levels, or scores, of the individual digits. For example, the OCR application may average the digit scores, sum the digit scores, or perform any other suitable action to the digit scores.

The OCR application, the user, the OCR system, the payment processing system, or any suitable party determines a threshold confidence level for the results of the OCR algorithm. For example, a user may input a requirement into the OCR application that the OCR algorithm must produce a result that is 90% likely to be accurate.

If the results of the OCR algorithm are over the configured threshold, then the OCR application supplies the relevant card information to the requestor, as described herein. If the results of the OCR algorithm are below the configured threshold, then the OCR application isolates a second card image.

The OCR application reapplies the OCR algorithm in the manner described herein and determines a confidence level for the second image. The OCR application may repeat the process of isolating images and applying the OCR algorithm until the results are over the configured threshold.

In another example, the OCR application performs the OCR algorithm on multiple images and compares the confidence level of the results. The OCR application may select the image with the highest confidence level as a candidate image and compare the confidence level to the threshold as described herein. If the highest confidence level is not above the threshold, then the OCR application may obtain additional images or pursue any suitable strategy as described herein.

In another example, the OCR application performs the OCR algorithm on multiple images and compares the confidence level of the results. The OCR application may select the image with the highest confidence level and verify the results of the selected image. The results of the selected image, despite being below the configured threshold, are supplied to the requestor, as described herein.

The OCR application may perform any tests to the extracted data to confirm the validity of the data. For example, the OCR application may apply a checksum algorithm to the data to verify that the digits meet the expected format. The OCR application may check the appropriate digits representing the issuer identification number ("IIN") against a database to verify that the digits match an expected IIN. Any suitable verification of the digits may be performed on the extracted data.

In another example embodiment, the OCR application blends card images to improve the resolution of the images. The OCR application may isolate multiple images of the card as described herein.

The OCR application may prepare the images for blending. For example, the OCR application may align the images to the same orientation. All of the images may be rotated digitally to be in a fronto-parallel position or rotated to any orientation similar to each other. The images may be scaled, or otherwise resized, such that all of the card images are the same size.

The OCR application blends the images together to create an image with a higher resolution than the single images. A general term for techniques that blend images to form a higher resolution image is super-resolution. The blending of the images may be performed via any suitable manipulation of the images. The blending may be performed by a mathematical computational representation of the images. Any suitable method of blending digital images into an image with higher resolution can be employed.

The OCR application applies the OCR algorithm to the blended image as described herein. The OCR application determines a confidence level of the results of the OCR algorithm as described herein.

If the results of the OCR algorithm are over the configured threshold, then the OCR application supplies the relevant card information to the requestor, as described herein. If the results of the OCR algorithm are below the configured threshold, then the OCR application may incorporate additional images in the blended image. Alternatively, the OCR application may use different images to create the blended image. Alternatively, the OCR application may obtain new images from the camera to create a new blended image. Any suitable manner of producing a new blended image may be employed.

The OCR application may reapply the OCR algorithm to the new blended image and assess the confidence level of the image, as described herein. The process may be repeated until the confidence level is achieved or the OCR application rejects the attempt.

In another example embodiment, the OCR application models the multiple images in three dimensions and uses the three-dimensional ("3D") model to improve the accuracy of the OCR algorithm.

The OCR application captures multiple images of the card from various viewing angles and perspectives. The OCR application captures the images from a scan of the card. For example, the user may be instructed to hover the camera of a user computing device over a card and to move the camera in various directions to obtain the proper perspectives.

The OCR application models the images of the card in 3D space. The OCR application may combine, merge, blend, rotate, or otherwise manipulate the images to produce a 3D model of the card in the images to allow the images to be realigned to different perspectives. The 3D model may be created by a digital manipulation of the images by the OCR application or another computing device.

In certain embodiments, the user computing device may be equipped with two cameras which can directly capture a stereo pair of images, reducing the need to capture a sequence to build a 3D model. Other technologies may project an IR pattern into the scene captured with an IR camera to produce a 3D model. Any other technology that will produce a 3D model may be utilized.

The OCR application applies the OCR algorithm to the 3D model of the card image. The OCR algorithm may be applied in a similar manner to the methods described herein with two-dimensional images. The OCR algorithm may be customized for a 3D image.

The OCR algorithm may be applied to multiple perspectives in the 3D model or multiple images that comprise the 3D model. The OCR algorithm may user the multiple perspectives of the model to allow a better analysis of any embossed digits on the card. The embossed digits may be interpreted more easily if viewed from multiple angles, as with a 3D image, than in a traditional fronto-parallel viewing. As the perspective is varied over the 3D image, the view of the embossed digits may shift. The OCR algorithm may take advantage of the shifting view and more accurately analyze the digits.

The OCR application determines a confidence level of the results of the OCR algorithm as described herein.

If the results of the OCR algorithm are over the configured threshold, then the OCR application supplies the relevant card information to the requestor. If the results of the OCR algorithm are below the configured threshold, then the OCR application may incorporate additional images in the 3D image. Alternatively, the OCR application may use different images to create the 3D image. Alternatively, the OCR application may obtain new images from the camera to create a new 3D image. Any suitable manner of producing a new 3D image may be employed.

In another example, the OCR application performs the OCR algorithm on multiple 3D images and compares the confidence level of the results. The OCR application may select the 3D image with the highest confidence level as a candidate image and compare the confidence level to the threshold as described herein. If the highest confidence level is not above the threshold, then the OCR application may obtain additional 3D images or pursue any suitable strategy as described herein.

In another example, the OCR application performs the OCR algorithm on multiple 3D images and compares the confidence level of the results. The OCR application may select the 3D image with the highest confidence level and verify the results of the selected 3D image. The results of the selected 3D image, despite being below the configured threshold is supplied to the requestor, as described herein.

In another example embodiment, the payment processing system, the OCR application, a merchant server, or another suitable party uses the 3D model of the card to capture embossed text and holographic images. The payment processing system represents any party that uses the 3D model to prevent fraud. Some or all of the functions of the payment processing system may be performed by the OCR application or another party. The payment processing system compares the hologram and embossed text to a standard to prevent a fraudulent scanning. The 3D model may prevent a fraudulent two-dimensional representation of the card from being authorized by the payment processing system. For example, the method disclosed herein may prevent a user from attempting to scan a photocopy or picture of a card.

The OCR application obtains a scan of the card and creates a 3D model of the card as described herein. The OCR application transmits the 3D model to the payment processing system, the OCR system, or any suitable requestor of the 3D model. The payment processing system may use the 3D model to confirm that the card being scanned is authentic. The OCR application may transmit the 3D model via an Internet connection over the network, email, text, or in any suitable manner.

The payment processing system compares the 3D model to a database or other storage location. The payment processing system may access images of the hologram or the embossed letters for a comparison to the transmitted 3D model. The payment processing system may compare the 3D model to images related to the type of card identified by the OCR application, by the user, by the payment processing system, or by any suitable party. For example, the OCR application may transmit data identifying the card as a credit card associated with a particular issuer at the time the 3D model is transmitted. In another example, the payment processing system identifies the type of card from the 3D model and uses images associated with the card type in the database for a comparison.

The payment processing system may compare the 3D model to the images in the database in any suitable manner to confirm that the 3D model matches the standard. In an example, the payment processing system accesses the stored images of the card type from particular perspectives. The payment processing system shifts or rotates the 3D model to obtain perspectives of the 3D model that match the perspectives of the images from the database. The payment processing system compares the images to the perspectives of the 3D model.

In an example, the payment processing system may determine whether some or all of the digits are embossed. If the user were submitting a fraudulent image, such as a flat photocopy of a card, the digits may not appear as embossed. The payment processing system may additionally determine if the proper sets of digits are embossed. In another example, the payment processing system may determine if the image presented by the hologram at a particular perspective matches the image of the hologram at that perspective in the stored image. As the hologram image changes as the perspective changes, the payment processing system may determine if the hologram matches at multiple perspectives.

If the results of the comparison indicate a match between the 3D model and the stored images, then the payment processing system supplies an authentication of the card information to a requestor of the authentication. The requestor may be the payment processing system, the OCR application, a merchant system, or any other suitable requestor. If the results of the comparison do not indicate a match between the 3D model and the stored images, then the payment processing system may request additional images in the 3D model from the OCR application. Alternatively, the payment processing system may request different images to create the 3D model. Any suitable manner of producing a new 3D image may be employed. Alternatively, the OCR application may reject the authentication request.

Example System Architecture

Turning now to the drawings, in which like numerals represent like (but not necessarily identical) elements throughout the figures, example embodiments are described in detail.

FIG. 1 is a block diagram depicting a system for extracting financial account information with relaxed card alignment and for extracting financial account information from multiple cards, in accordance with certain example embodiments. As depicted in FIG. 1, the system 100 includes network computing devices 110, 120, 140, and 170 that are configured to communicate with one another via one or more networks 105. In some embodiments, a user associated with a device must install an application and/or make a feature selection to obtain the benefits of the techniques described herein.

Each network 105 includes a wired or wireless telecommunication means by which network devices (including devices 110, 120, 140, and 170) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment.

Each network computing device 110, 120, 140, and 170 includes a device having a communication module capable of transmitting and receiving data over the network 105. For example, each network device 110, 120, 140, and 170 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 120, 140, and 170 are operated by end-users or consumers, OCR system operators, and payment processing system operators, and card issuer operators, respectively.

The user 101 can use the communication application 112, which may be, for example, a web browser application or a stand-alone application, to view, download, upload, or otherwise access documents or web pages via a distributed network 105. The network 105 includes a wired or wireless telecommunication system or device by which network devices (including devices 110, 120, 140, and 170) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages.

The user computing device 110 may employ a communication module 112 to communicate with the web server 124 of the OCR system 120 or other servers. The communication module 112 may allow devices to communicate via technologies other than the network 105. Examples might include a cellular network, radio network, or other communication network.

The user device 110 may include a digital wallet application module 111. The digital wallet application module 111 may encompass any application, hardware, software, or process the user device 110 may employ to assist the user 101 in completing a purchase. The digital wallet application module 111 can interact with the communication application 112 or can be embodied as a companion application of the communication application 112. As a companion application, the digital wallet application module 111 executes within the communication application 112. That is, the digital wallet application module 111 may be an application program embedded in the communication application 112.

The user device 110 may include an optical character recognition ("OCR") application 115. The OCR application 115 may interact with the communication application 112 or be embodied as a companion application of the communication application 112 and execute within the communication application 112. In an exemplary embodiment, the OCR application 115 may additionally or alternatively be embodied as a companion application of the digital wallet application module 111 and execute within the digital wallet application module 111. The OCR application 115 may employ a software interface that may open in the digital wallet application 111 or may open in the communication application 112. The interface can allow the user 101 to configure the OCR application 115.

The OCR application 115 may be used to analyze a card and extract information or other data from the card. The OCR system 120 or other system that develops the OCR algorithms or other methods may include a set of computer-readable program instructions, for example, using JavaScript, that enable the OCR system 120 to interact with the OCR application 115.

Any of the functions described in the specification as being performed by the OCR application 115 can be performed by the payment processing system 140, the OCR system 120, the user computing device 110, the digital wallet application module 111, a merchant system (not pictured) or any other suitable hardware or software system or application. In an example, the OCR application 115 on the user computing device 110 may obtain an image of a card 102 and transmit the image to the OCR system 120 to extract the information on the card 102.

The user device 110 includes a data storage unit 113 accessible by the OCR application 115, the web browser application 112, or any suitable computing device or application. The exemplary data storage unit 113 can include one or more tangible computer-readable media. The data storage unit 113 can be stored on the user device 110 or can be logically coupled to the user device 110. For example, the data storage unit 113 can include on-board flash memory and/or one or more removable memory cards or removable flash memory.

The user device 110 may include a camera 114. The camera may be any module or function of the user computing device 110 that obtains a digital image. The camera 114 may be onboard the user computing device 110 or in any manner logically connected to the user computing device 110. The camera 114 may be capable of obtaining individual images or a video scan. Any other suitable image capturing device may be represented by the camera 114.

The payment processing computing system 140 includes a data storage unit 147 accessible by the web server 144. The example data storage unit 147 can include one or more tangible computer-readable storage devices. The payment processing system 140 is operable to conduct payments between a user 101 and a merchant system (not pictured). The payment processing system 140 is further operable to manage a payment account of a user 101, maintain a database to store transactions of the merchant system and the user 101, verify transactions, and other suitable functions.

The user 101 may use a web server 144 on the payment processing system 140 to view, register, download, upload, or otherwise access the payment processing system 140 via a website (not illustrated) and a communication network 105). The user 101 associates one or more registered financial card accounts, including bank account debit cards, credit cards, gift cards, loyalty cards, coupons, offers, prepaid offers, store rewards cards, or other type of financial account that can be used to make a purchase or redeem value-added services with a payment account of the user 101.

A card issuer, such as a bank or other institution, may be the issuer of the financial account being registered. For example, the card issuer may be a credit card issuer, a debit card issuer, a stored value issuer, a financial institution providing an account, or any other provider of a financial account. The payment processing system 140 also may function as the issuer for the associated financial account. The user's 101 registration information is saved in the payment processing system's 140 data storage unit 147 and is accessible the by web server 144. The card issuer employs a card issuer computing system 170 to issue the cards, manage the user account, and perform any other suitable functions. The card issuer system 170 may alternatively issue cards used for identification, access, verification, ticketing, or cards for any suitable purpose. The card issuer system 170 may employ a web server 174 to manage the user account and issue cards 102.

The OCR computing system 120 utilizes an OCR system web server 124 operating a system that produces, manages, stores, or maintains OCR algorithms, methods, processes, or services. The OCR system web server 124 may represent the computer implemented system that the OCR system 120 employs to provide OCR services to user computing devices 110, merchants, or any suitable part. The OCR system web server 124 can communicate with one or more payment processing systems 140, a user device 110, or other computing devices via any available technologies. These technologies may include, but would not be limited to, an Internet connection via the network 105, email, text, instant messaging, or other suitable communication technologies. The OCR system 120 may include a data storage unit 127 accessible by the web server 124 of the OCR system 120. The data storage unit 127 can include one or more tangible computer-readable storage devices.

Any of the functions described in the specification as being performed by the OCR system 120 can be performed by the OCR application 115, the user computing device 110, or any other suitable hardware or software system or application.

The user 101 may employ the card 102 when making a transaction, such as a purchase, ticketed entry, loyalty check-in, or other suitable transaction. The user 101 may obtain the card information for the purpose of importing the account represented by the card 102 into a digital wallet application module 111 of a computing device 110 or for other digital account purposes. The card 102 is typically a plastic card containing the account information and other data on the card 102. In many card 102 embodiments, the customer name, expiration date, and card numbers are physically embossed on the card 102. The embossed information is visible from both the front and back of the card 102, although the embossed information is typically reversed on the back of the card 102.

It will be appreciated that the network connections shown are exemplary and other means of establishing a communications link between the computers and devices can be used. Moreover, those having ordinary skill in the art having the benefit of the present disclosure will appreciate that the user device 110, OCR system 120, payment processing system 140, and card issuer system 170 illustrated in FIG. 1 can have any of several other suitable computer system configurations. For example, a user device 110 embodied as a mobile phone or handheld computer may not include all the components described above.

Example Processes

The example methods illustrated in FIG. 2-6 are described hereinafter with respect to the components of the example operating environment 100. The example methods of FIG. 2-6 may also be performed with other systems and in other environments.

Figure 2:
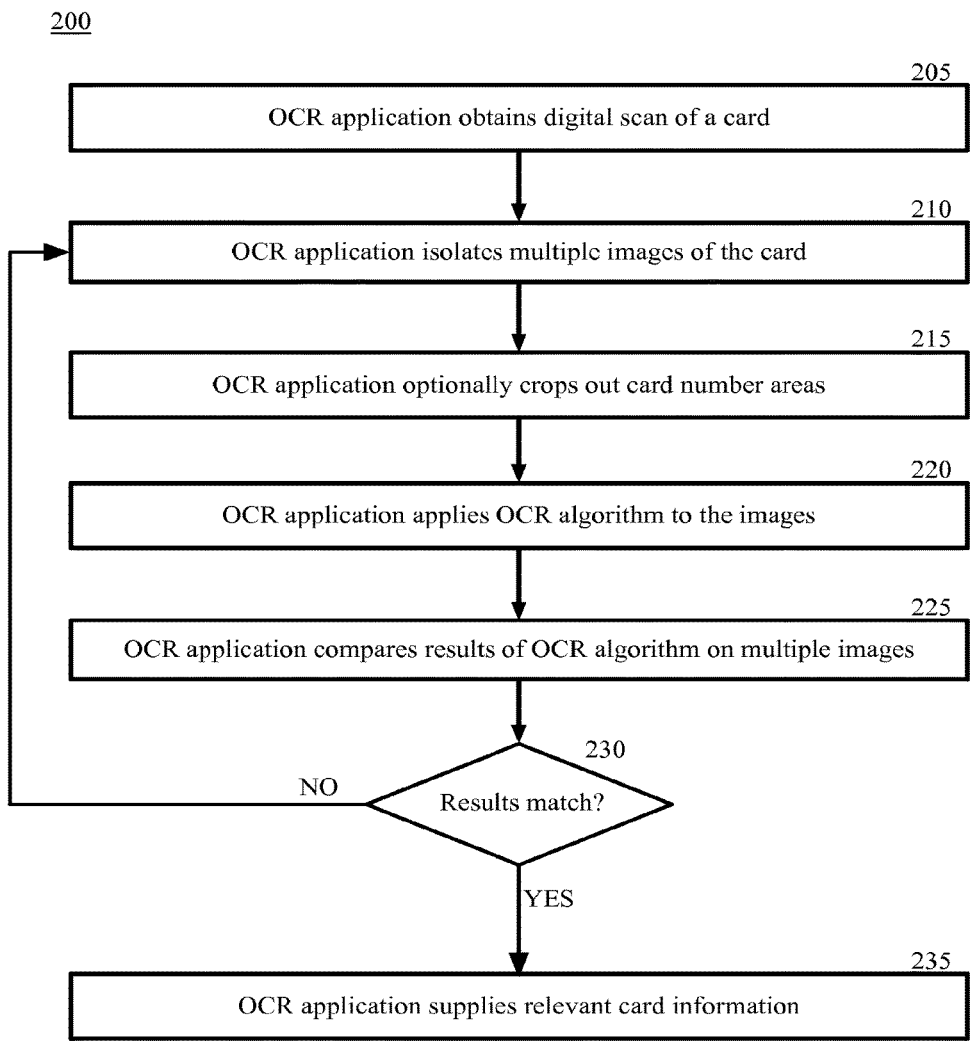
FIG. 2 is a block flow diagram depicting methods for extracting financial account information using multiple images, in accordance with certain example embodiments.

FIG. 2 is a block flow diagram depicting a method 200 for extracting financial account information using multiple images, in accordance with certain example embodiments.

With reference to FIGS. 1 and 2, in block 205, optical character recognition ("OCR") application 115 on the user device 110 obtains a digital scan or a set of images of a card 102. The image may be obtained from the camera 114 module of a user computing device 110, such as the camera 114 on a mobile phone. The images may be obtained from any digital image device coupled to the user computing device 110 or any other suitable digital imaging device. The images may be accessed by the OCR application 115 on the user computing device 110 from a storage location on the user storage device 110, from a remote storage location, or from any suitable location. All sources capable of providing the image will be referred to as a "camera."

An OCR application 115 receives the images of the card 102 from the camera 114. The functions of the OCR application 115 may be performed by any suitable module, hardware, software, or application operating on the user computing device 110. Some, or all, of the functions of the OCR application 115 may be performed by a remote server or other computing device, such as the server 124 operating in an OCR system 120. For example, a digital wallet application module 111 on the user computing device 110 may obtain the images of the card 102 and transmit the images to the OCR system 120 for processing. In another example, some of the OCR functions may be conducted by the user computing device 110 and some by the OCR system 120 or another remote server. Examples provided herein may indicate that many of the functions are performed by an OCR application 115 on the user computing device 110, but some or all of the functions may be performed by any suitable computing device.

The image of the card 102 is presented on the user interface of the user computing device 110 as, for example, a live video image of the card 102. The OCR application 115 may isolate and store one or more images from the video feed of the camera 114. The OCR application 115 may store a scan of the card 102 as a video or other suitable format comprising multiple images of the card 102. For example, the user 101 may hover the camera 114 of a user computing device 110 over a financial card 102 and observe the representation of the financial card 102 on the user interface of the user computing device 110. The user 101 may actuate a real or virtual button on the user computing device 110 to capture a preferred image, a group of images, or a digital scan. The OCR application 115 may select the preferred images automatically.

In certain examples, some or all of the functions described are performed while the scan is active. For example, the user 101 may hover the camera 114 of a user computing device 110 over the card and the methods described herein are performed with live images of the card 102. That is, the OCR application 115 captures and utilizes images from the active feed of the camera 114.

Figure 7:
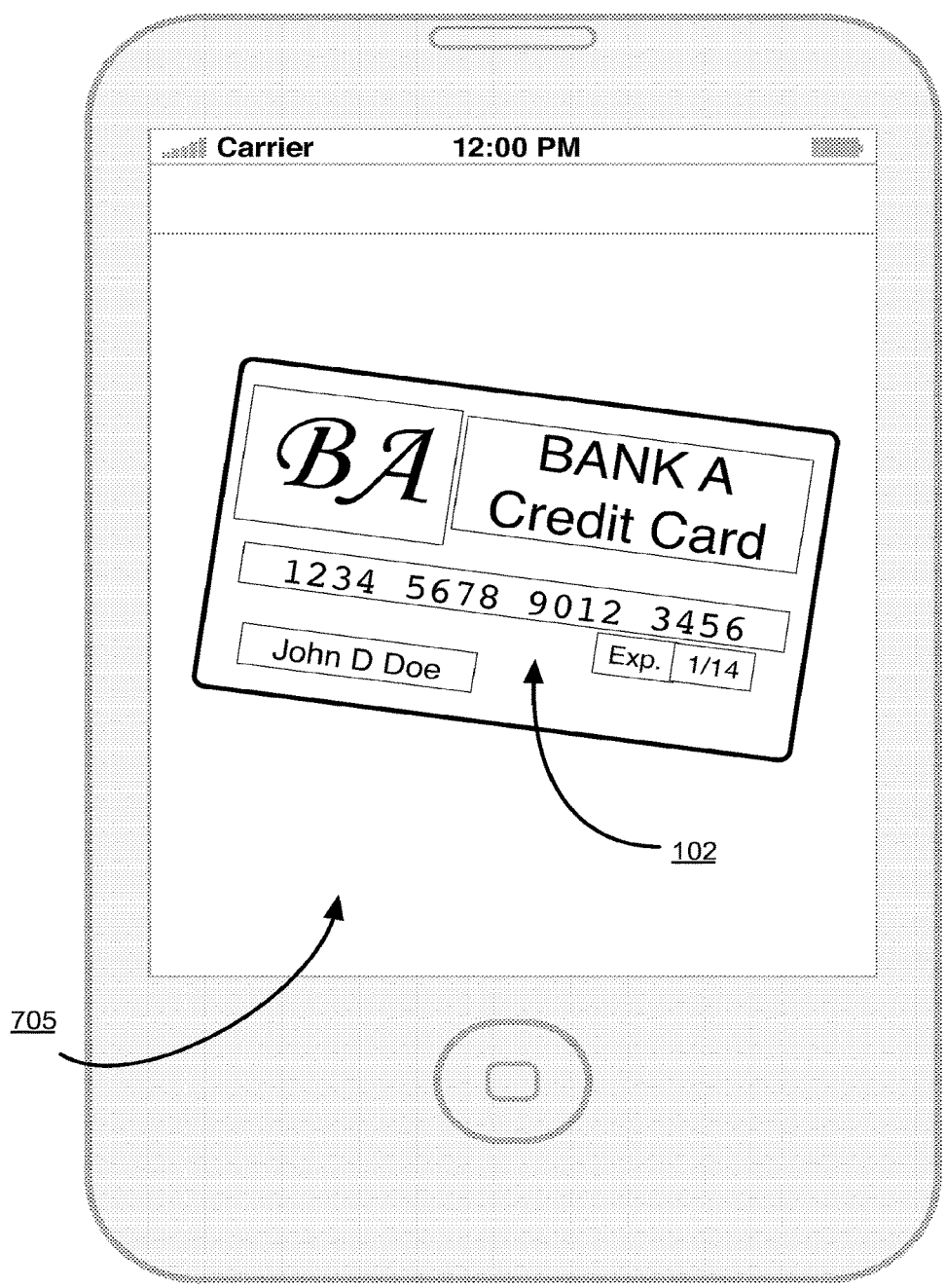
FIG. 7 is an illustration of a user computing device displaying an image of a financial card, in accordance with certain example embodiments.
Figure 8:
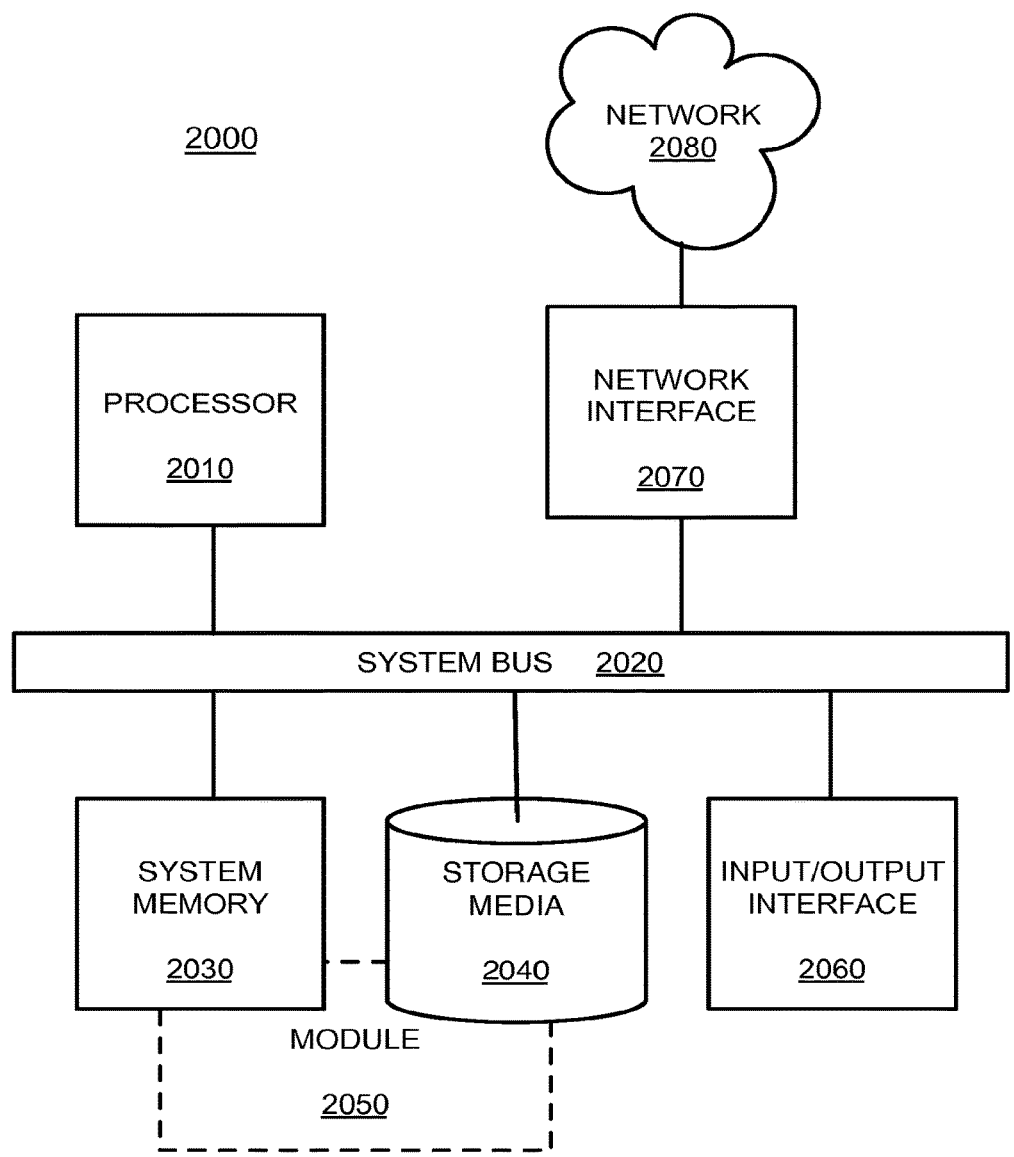
FIG. 8 is a block diagram depicting a computing machine and a module, in accordance with certain example embodiments.

An illustration of the card 102 displayed on the user computing device 110 is presented in FIG. 7.

FIG. 7 is an illustration of a user computing device 110 displaying an image of a financial card, in accordance with certain example embodiments. The user computing device 110 is shown as a mobile smartphone. The user computing device 110 is shown with a display screen 705 as a user interface. The card 102 is shown displayed on the user computing device 110.

Returning to FIG. 2, in block 210, the OCR application 115 isolates the image of the card. Any image data manipulation or image extraction may be used to isolate the card image.

The OCR application 115, the camera module 114, or the user computing device 110, or other computing device performs blur detection on the images. The image may be recognized as blurry, overly bright, overly dark, or otherwise obscured in a manner that prevents a high resolution image from being obtained. The OCR application 115, or other function of the user computing device 110 or the camera 114, may adjust the image capturing method to reduce the blur in the image. For example, the OCR application 115 may direct the camera 114 to adjust the focus on the financial card 102. In another example, the OCR application 115 may direct the user 101 to move the camera 114 closer to, or farther away from, the card 102. In another example, the OCR application 115 may perform a digital image manipulation to remove the blur. Any other method of correcting a blurred image can be utilized.

In block 215, the OCR application 115 may crop the image to display only the desired information from the card 102. For example, if the card 102 in the image is a credit card, the OCR application 115 accesses information associated with the expected location of the account number of a credit card. The expected location may be obtained from a database of card layouts stored on the user computing device 110 or in another suitable location. Credit cards, driver's licenses, loyalty cards, and other cards typically meet an industry standard for the data locations and the layout of the card. The industry standards may be stored in the OCR application 115 or in a location accessible by the OCR application 115. In certain circumstances, the data locations may be provided by the issuer of the card 102.

In block 220, the OCR application 115 applies an OCR algorithm to two or more of the card images to identify the information on the card 102. The information may be digits, characters, or other data or information. Each instance of information or data will be referred to as a "digit." The OCR algorithm may represent any process, program, method, or other manner of recognizing the digits represented on the card image. The OCR application 115 extracts the digits and may display the extracted digits on the user interface of the user computing device 110. The groups may be sorted into categories such as account numbers, user name, expiration date, card issuer, or other suitable data. The OCR application 115 may categorize the groups of digits by comparing the formats of groups of digits to a database of formats. For example, if the results of the OCR algorithm on a group of digits is "10/15", then the OCR application may interpret the format as being associated with an expiration date.

In block 225, the OCR application 115 compares the results from applying the OCR algorithm to each of the images. The OCR application 115 determines if the results match. For example, the OCR application 115 may compare the results for each category of digits on the images to determine if the same digits were produced for each category for each of the compared images. For example, if the user name is determined to be "John D Smith" in each of the images, then the OCR application 115 determines that the name is correctly extracted. The OCR application 115 may compare the results for every digit or group of digits on the images. The OCR application 115 may compare the results for a configured number of images. For example, the OCR application 115 may compare the results for 3 or 4 images from the scan of the card. Any suitable number of images may be compared based on user preference, OCR application 115 capabilities, user computing device 110 processing capacity, time restraints, or any other suitable limiting factor.

The user, the OCR application 115, or another suitable party may set a threshold percentage of the results that must match for the information to be accepted. For example, if 3 of the 4 results indicate that the user name is "John Smith," but a single result indicated that the user name was "Jahn Smith," then the OCR application 115 may determine that 3 out of 4 is sufficient to declare a match. Alternatively, the OCR application 115 may require that all digits on all images match.

In block 230, the method 200 determines if the result of the comparison produced matching data. If the result was a match, then the method 200 follows the "YES" branch of block 230 to block 235. If the result was not a match, then the method 200 may reject the results, apply the OCR algorithm to the images again, or obtain additional images.

In an example, the method 200 follows the "NO" branch of block 230 to block 210. The OCR application 115 may access additional images from the scan stored in the user computing device 110 or in another suitable location. The OCR application 115 may access additional images from the live scan. In another example, the OCR application 115 may scan the card again and capture additional images for analysis. Any other suitable method may be utilized to obtain additional images. The OCR application 115 may use the same number of images for the subsequent comparison or the OCR application 115 may change the number of images analyzed.

The OCR application 115 performs the OCR algorithm on the new images or reapplies the OCR algorithm to the previous images. The OCR application 115 may continue the process of comparing the results of the OCR algorithm until a set of results match. The OCR application 115 may repeat the method described herein for a configured number of attempts. For example, the OCR application 115 may attempt to obtain matching results for 2 or 3 additional sets of images. The OCR application 115 may then reject the results or provide further instructions to the user 101.

In block 235, the OCR application 115 supplies the extracted data to a digital wallet application module 111, point of sale terminal, payment processing system 140, website, or any suitable application or system that the user 101 desires. The extracted data may be used by an application on the user computing device 110. The extracted data may be transmitted via an Internet connection over the network 105, via a near field communication ("NFC") technology, emailed, texted, or transmitted in any suitable manner.

Figure 3:
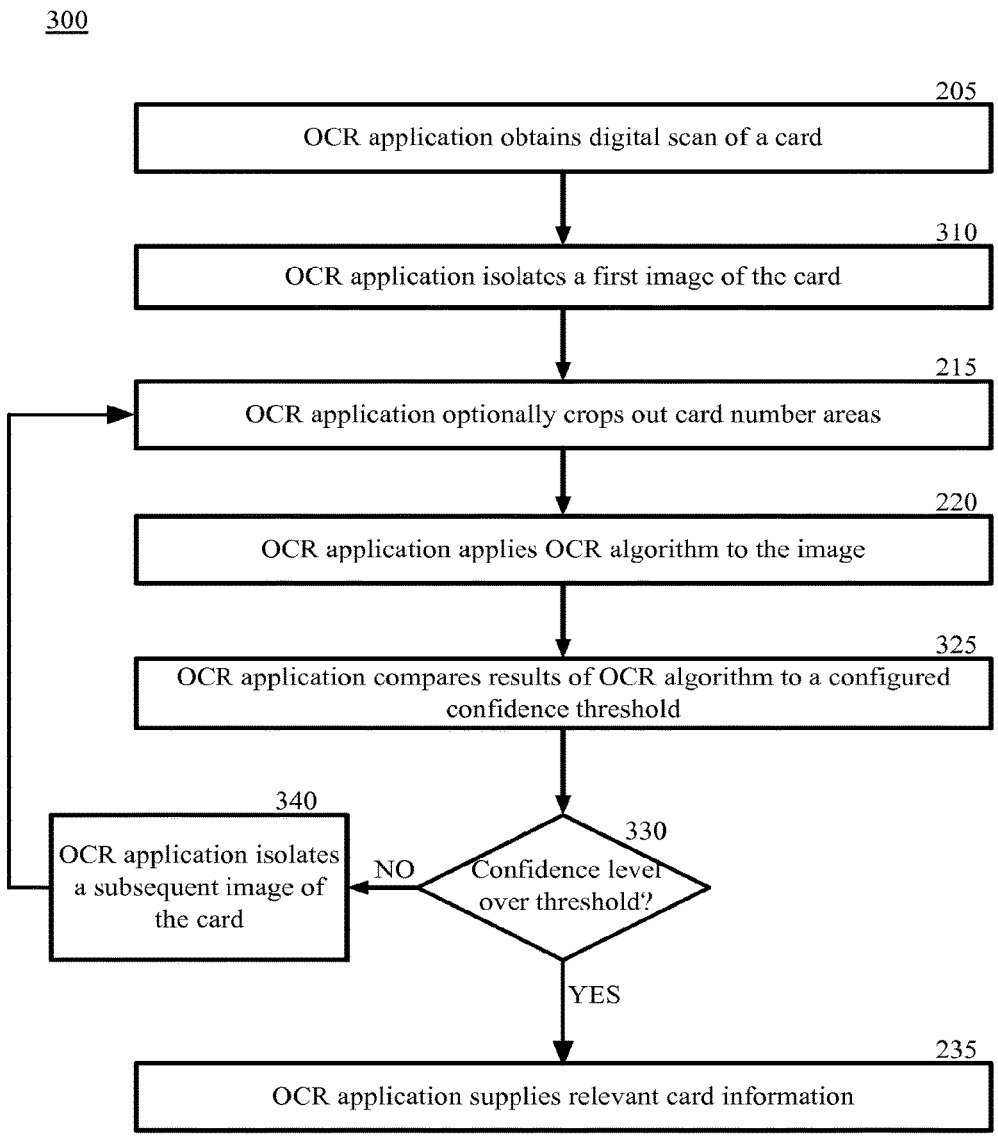
FIG. 3 is a block flow diagram depicting methods for extracting financial account information to achieve a configured confidence threshold, in accordance with certain example embodiments.

FIG. 3 is a block flow diagram depicting a method 300 for extracting financial account information to achieve a configured confidence threshold, in accordance with certain example embodiments. In block 205, the OCR application 115 obtains a digital scan of a card as described in block 205 of FIG. 2.

In block 310, the OCR application 115 isolates a first image from the scan of the card 102. The OCR application 115 may select an image that is determined to be the least blurry, the most bright, or in any suitable manner is a preferred image. The user 101 may manually select the first image. Any other manner of selecting the first image can be utilized.

In block 215 and 220, the OCR application 115 crops the image and performs an OCR algorithm on the card image on the card as described in blocks 215 and 220 in method 200 of FIG. 2.

In block 325, the OCR application 115 compares the confidence level of the results of the OCR algorithm to a configured threshold.

The OCR application 115 determines the confidence level of the results of the OCR algorithm. Any manner of assessing a confidence level may be used. For example, the OCR application 115 may use a machine learning algorithm to determine the likelihood that a digit is correct. The machine learning algorithm may be updated with some or all of the verifications or revisions of the results by the user 101.

In an example, the OCR application 115 may determine the confidence level for each digit by determining the difference in the confidence level between the top two digit candidates. That is, the OCR application 115 may determine that a digit meets many of the characteristics of a "1" and assess a score to the particular digit of 80%. The OCR application 115 may determine that the same digit meets many of the characteristics of a "7" and assess a score to the particular digit of 60%. Then, the OCR application 115 may assess a particular confidence level based at least in part on the difference between the two digit scores.

The OCR application 115 may determine the confidence level for all of the data on the card based on the confidence levels, or scores, of the individual digits. For example, the OCR application 115 may average the digit scores, sum the digit scores, or perform any other suitable action to the digit scores.

The OCR application 115, the user 101, the OCR system 120, the payment processing system 140, or any suitable party determines a threshold confidence level for the results of the OCR algorithm. For example, a user 101 may input a requirement into the OCR application 115 that the OCR algorithm must produce a result that is 90% likely to be accurate.

In block 330, the method 300 determines if the results of the OCR algorithm are equal to or greater than the configured threshold. If a result is equal to or greater than the configured threshold, then the method 300 follows the "YES" branch of block 330 to block 235. If the result is below the configured threshold, then the method 300 follows the "NO" branch of block 330 to block 340.

Following the NO branch to block 340, the OCR application 115 isolates a second card image. The image may be obtained from stored images from the first scan or a subsequent scan. The image may be obtained from a live scan that provides images in a video feed to the user computing device 110. The image may be obtained from any suitable source.

The OCR application 115 reapplies the OCR algorithm in the manner described in blocks 215, 220, and 325. A confidence level for the second image is determined and compared to the configured threshold as in block 330 described herein. The OCR application 115 may repeat the process of isolating images and applying the OCR algorithm until the result of a particular image is over the configured threshold.

Additionally or alternatively, the OCR application 115 performs the OCR algorithm on multiple images and compares the confidence level of the results. The OCR application 115 may select the image with the highest confidence level as a candidate image and compare the confidence level to the threshold as described herein. If the highest confidence level is not above the threshold, then the OCR application 115 may obtain additional images or pursue any suitable strategy as described herein.

In another example, the OCR application 115 performs the OCR algorithm on multiple images and compares the confidence level of the results. The OCR application 115 may select the image with the highest confidence level and verify the results of the selected image. The results of the selected image, despite the possibility of being below the configured threshold, are supplied to the requestor, as described in block 235.

The OCR application 115 may apply any tests to the extracted data to confirm the validity of the data. For example, the OCR application 115 may apply a checksum algorithm to the data to verify that the digits meet the expected format. The OCR application 115 may check the appropriate digits representing the issuer identification number ("IIN") against a database to verify that the digits match an expected IIN. Any suitable verification of the digits may be performed on the extracted data.

Following the YES branch of block 330 to block 235, the OCR application 115 supplies the extracted data to a requestor as described in block 235 of FIG. 2.

Figure 4:
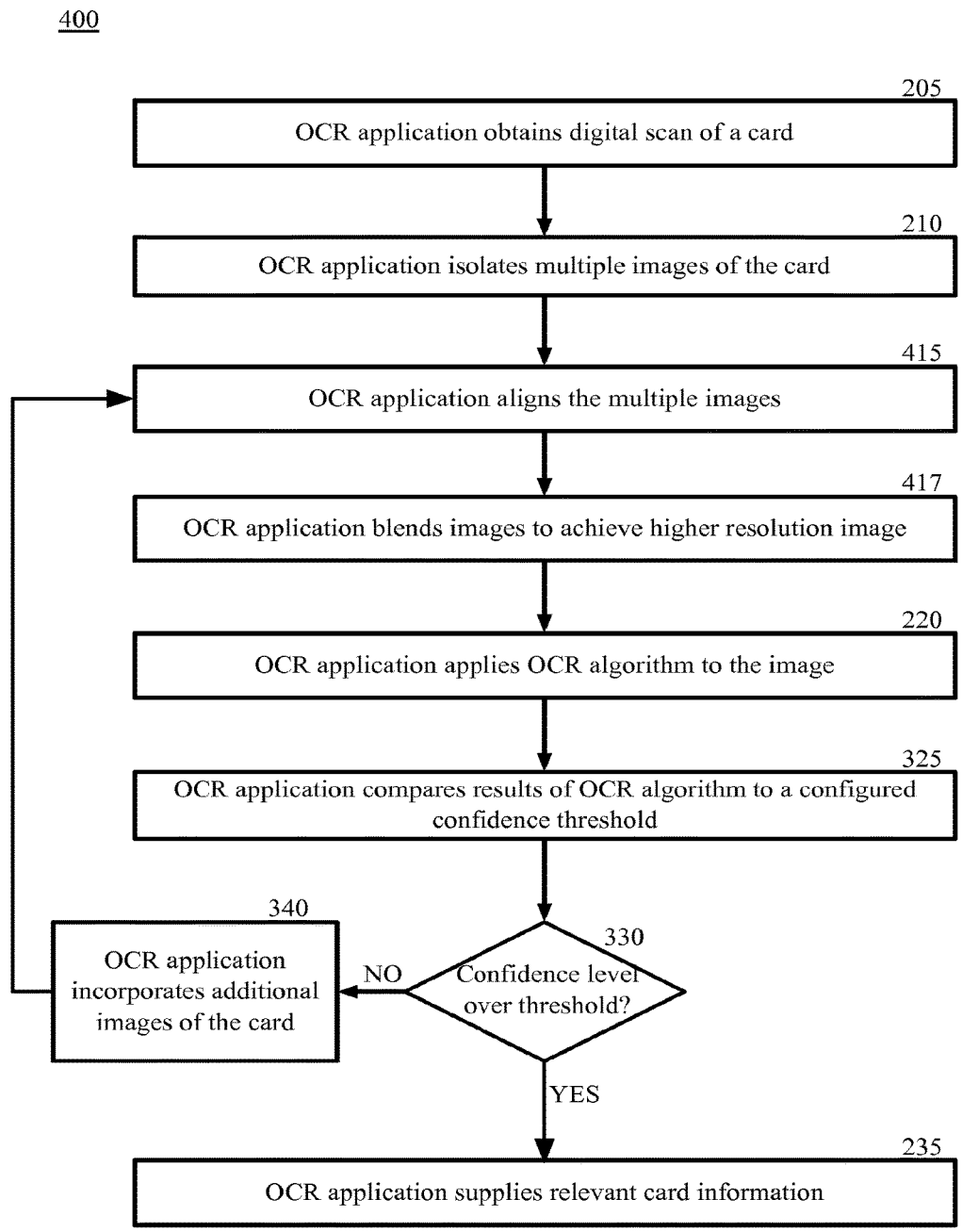
FIG. 4 is a block flow diagram depicting methods for extracting financial account information using blended images, in accordance with certain example embodiments.

FIG. 4 is a block flow diagram depicting a method 400 for extracting financial account information using blended images, in accordance with certain example embodiments.

In block 205 and 210, the OCR application 115 obtains a digital scan of a card and isolates multiple images of the card as described herein in blocks 205 and 210 of FIG. 2.

In block 415, the OCR application 115 aligns the images to the same orientation. All of the images may be rotated digitally to be in a fronto-parallel position or rotated to any orientation similar to each other. The images may be scaled, or otherwise resized, such that all of the card images are the same size. Any other digital manipulation of the images may be performed to standardize the size, shape, and perspective of the images to allow them to be blended.

In block 417, the OCR application 115 blends the images together to create an image with a higher resolution than the single images. The blending of the images may be performed via any suitable manipulation of the images. The blending may be performed by a mathematical computational representation of the images. Blending two images may produce an image with twice the number of pixels in the image. Any suitable method of blending digital images into an image with higher resolution can be employed.

In block 220, the OCR application 115 applies the OCR algorithm to the blended image as described in block 220 of FIG. 2.

In block 325, the OCR application 115 compares the results of the OCR algorithm to a configured confidence threshold as described in block 325 of FIG. 3.

In block 330, the OCR application determines if the results of the OCR algorithm are equal to or greater than the configured threshold as described in block 330 of FIG. 3. If a result is equal to or greater than the configured threshold, then the method 500 follows the "YES" branch of block 330 to block 235. If the result is below the configured threshold, then the method 400 follows the "NO" branch of block 330 to block 440.

Following the NO branch to block 440, the OCR application 115 may incorporate additional images in the blended image. Alternatively, the OCR application 115 may use different, stored images to create a new blended image. Alternatively, the new images may be obtained from the camera to create a new blended image.

The OCR application 115 may align the images and blend the images as described in blocks 415 and 417. Any suitable manner of producing a new blended image may be employed.

The OCR application 115 may reapply the OCR algorithm to the new blended image and assess the confidence level of the image, as described in blocks 220 and 325. The process may be repeated until a result is produced that equals or exceeds the confidence level or the OCR application rejects the attempt.

Additionally or alternatively, the OCR application 115 performs the OCR algorithm on multiple blended images and compares the confidence level of the results. The OCR application 115 may select the blended image with the highest confidence level as a candidate image and compare the confidence level to the threshold as described herein. If the highest confidence level is not above the threshold, then the OCR application 115 may obtain additional blended images or pursue any suitable strategy as described herein.

In another example, the OCR application 115 performs the OCR algorithm on multiple blended images and compares the confidence level of the results. The OCR application 115 may select the blended image with the highest confidence level and verify the results of the selected image. The results of the selected image, despite possibly being below the configured threshold, are supplied to the requestor, as described in block 235.

The OCR application 115 may perform any tests to the extracted data to confirm the validity of the data. For example, the OCR application 115 may apply a checksum algorithm to the data to verify that the digits meet the expected format. The OCR application 115 may check the appropriate digits representing the issuer identification number ("IIN") against a database to verify that the digits match an expected IIN. Any suitable verification of the digits may be performed on the extracted data.

Following the YES branch of block 330 to block 235, the OCR application 115 supplies the extracted data to a requestor as described in block 235 of FIG. 2.

Figure 5:
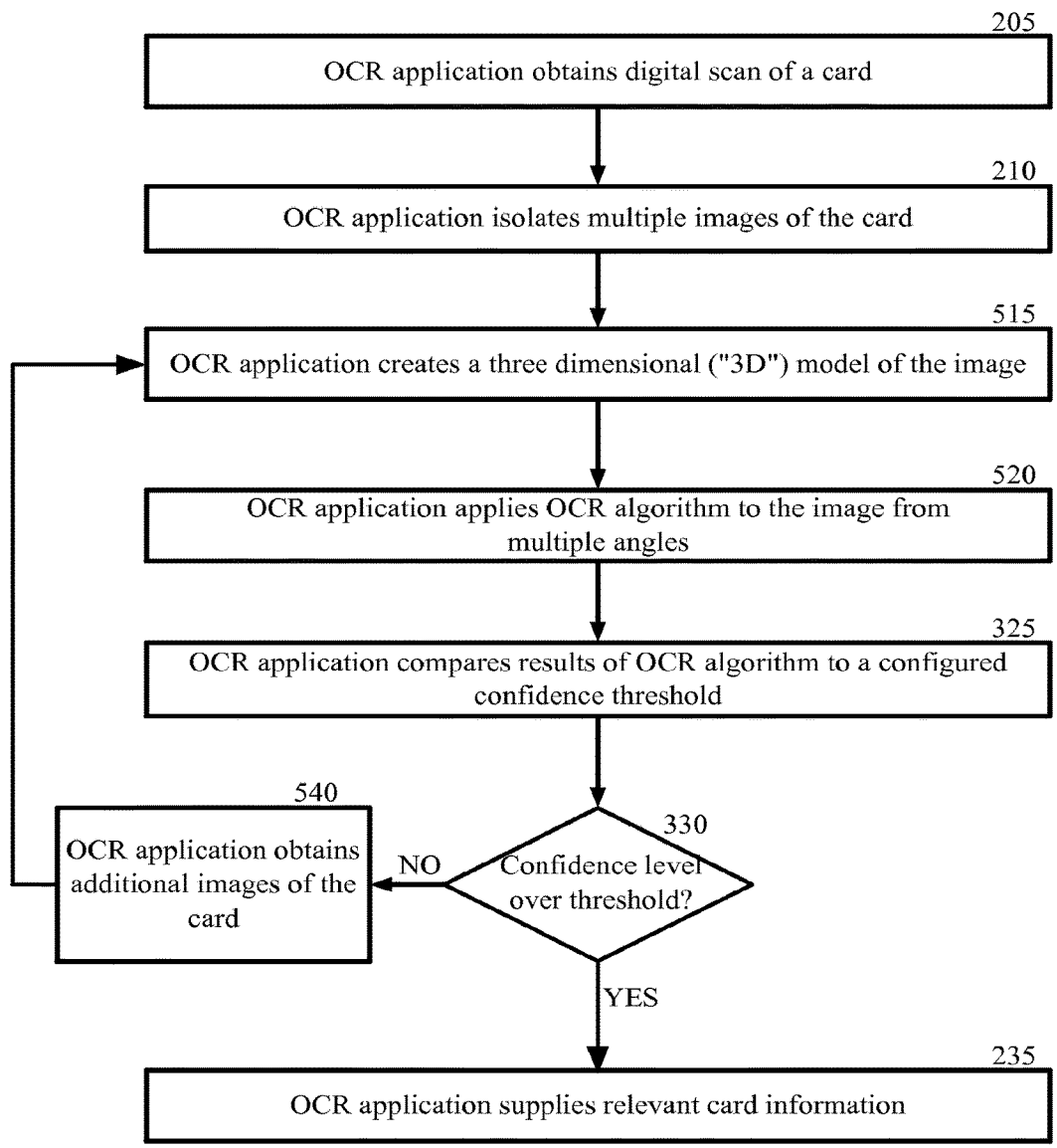
FIG. 5 is a block flow diagram depicting methods for extracting financial account information using a three-dimensional model, in accordance with certain example embodiments.

FIG. 5 is a block flow diagram depicting a method 500 for extracting financial account information using a three-dimensional ("3D") model, in accordance with certain example embodiments.

In block 205 and 210, the OCR application 115 obtains a digital scan of a card and isolates multiple images of the card as described herein in blocks 205 and 210 of FIG. 2. The OCR application 115 captures and stores images of the card 102 from various viewing angles and perspectives. The user 101 may be requested to hover the camera 114 of a user computing device 110 over a card and to move the camera 114 in various directions to obtain the proper perspectives.

In block 515, the OCR application 115 models the images of the card in 3D space. The OCR application 115 may combine, merge, blend, rotate, or otherwise manipulate the images to produce a 3D model of the card 102 in the images. The 3D model allows the view of the images to be realigned to different perspectives. The 3D model may be created by a digital manipulation of the images by the OCR application 115 or another computing device.

The 3D model is created by developing a mathematical representation of any three-dimensional surface of object. The product is called a 3D model. The 3D model may be displayed as a two-dimensional image through a process called 3D rendering.

When creating a 3D model, the OCR application 115 is unable to determine which point on a line corresponds to the image point from a single image. If two images are available, then the position of a 3D point can be found as the intersection of the two projection rays. The process is referred to as triangulation. If the OCR application 115 obtains multiple images from the camera 114, a detailed 3D model may be created from triangulating the many points on the images. The triangulation of the points allows the OCR application 115 to determine the depth of each point in the two-dimensional images. Once the multiple depth maps are created, the OCR application 115 combines the maps to create a final mesh by calculating depth and projecting out of the camera 114.

The 3D model may be rotated, zoomed, or in any manner manipulated to allow the OCR application 115 to view perspectives of the card 102 that are unavailable to a viewer of a two-dimensional image.

In block 520, the OCR application applies the OCR algorithm to the 3D model of the card image. The OCR algorithm may be applied in a similar manner to the methods described in block 220 of FIG. 2 with two-dimensional images. The OCR algorithm may be customized for a 3D image.

In block 325, the OCR application compares the results of the OCR algorithm to a configured confidence threshold as described in block 325 of FIG. 3.

In block 330, the method 500 determines if the results of the OCR algorithm are equal to or greater than the configured threshold. If a result is equal to or greater than the configured threshold, then the method 500 follows the "YES" branch of block 330 to block 235. If the result is below the configured threshold, then the method 300 follows the "NO" branch of block 330 to block 540.

Following the NO branch to block 540, the OCR application 115 obtains additional images of the card 102 for the 3D model. The images may be obtained from stored images from the first scan or a subsequent scan. The images may be obtained from a live scan that provides images in a video feed to the user computing device 110. The image may be obtained from any suitable source.

Returning to block 515, the OCR application 115 incorporates the additional images into the 3D model or creates a new 3D model including the additional images. The OCR application 115 may create a new 3D model with the additional images. The new 3D model may incorporate some or all of the previously used images to improve or revise the existing 3D model.

The OCR application 115 reapplies the OCR algorithm in the manner described in block 520. A confidence level for the second 3D model is determined and compared to the configured threshold as in block 330 described herein. The OCR application 115 may repeat the process of isolating images, creating 3D models, and applying the OCR algorithm until the results of a particular 3D model are over the configured threshold. The OCR application 115 may reject the card 102 after a configured number of attempts.

Additionally or alternatively, the OCR application 115 performs the OCR algorithm on multiple 3D models and compares the confidence level of the results. The OCR application 115 may select the 3D model with the highest confidence level as a candidate image and compare the confidence level to the threshold as described herein. If the highest confidence level is not above the threshold, then the OCR application 115 may obtain additional 3D models or pursue any suitable strategy as described herein.

In another example, the OCR application 115 performs the OCR algorithm on multiple 3D models and compares the confidence level of the results. The OCR application 115 may select the 3D model with the highest confidence level and verify the results of the selected image. The results of the selected 3D model, despite being below the configured threshold, are supplied to the requestor, as described in block 235.

The OCR application 115 may apply any tests to the extracted data to confirm the validity of the data. For example, the OCR application 115 may apply a checksum algorithm to the data to verify that the digits meet the expected format. The OCR application 115 may check the appropriate digits representing the issuer identification number ("IIN") against a database to verify that the digits match an expected IIN. Any suitable verification of the digits may be performed on the extracted data.

Following the YES branch of block 330 to block 235, the OCR application 115 supplies the extracted data to a requestor as described in block 235 of FIG. 2.

Figure 6:
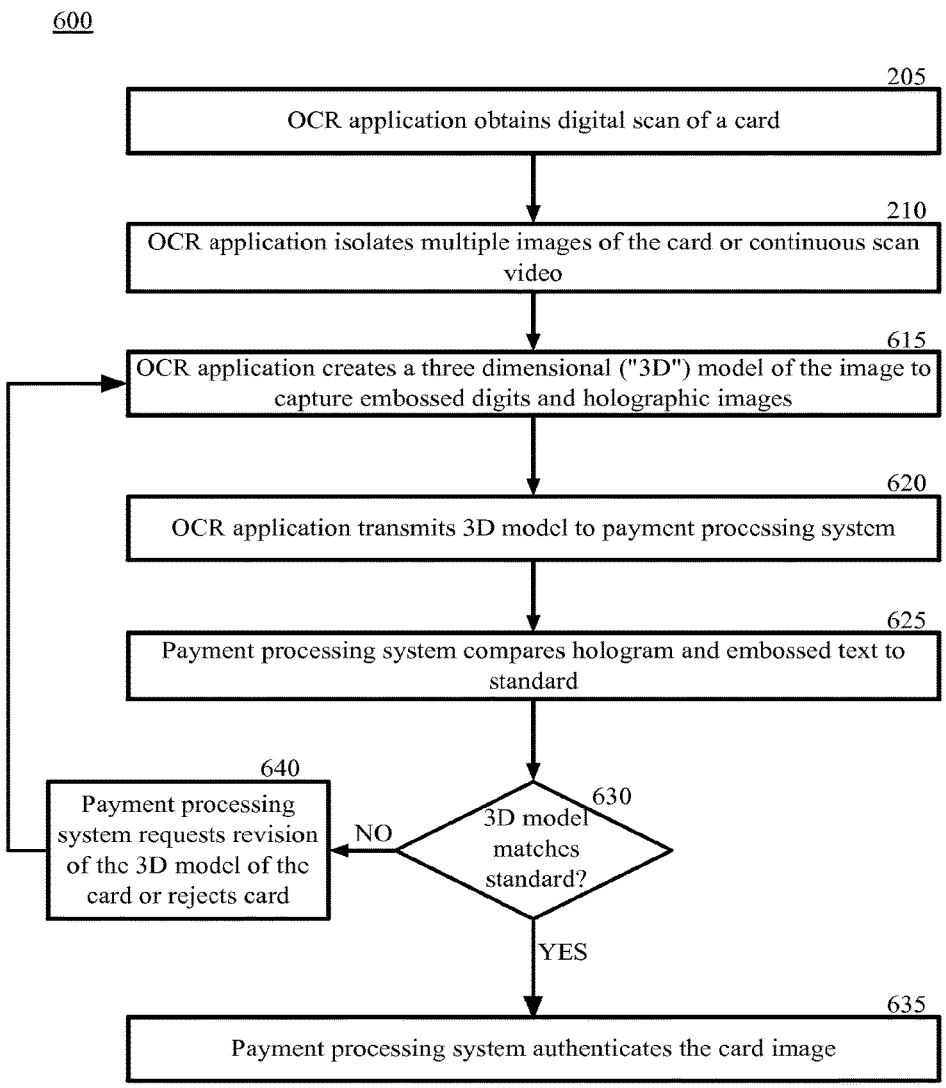
FIG. 6 is a block flow diagram depicting methods for using a three-dimensional model of a financial card to prevent fraud, in accordance with certain example embodiments.

FIG. 6 is a block flow diagram depicting a method 600 for using a three-dimensional model of a financial card 102 to prevent fraud, in accordance with certain example embodiments. The payment processing system 140, the OCR application 115, a merchant server, or another suitable party uses the 3D model of the card 102 to compare embossed text and holographic images to a stored standard. The payment processing system 140 represents any party that uses the 3D model to prevent fraud. Some or all of the functions of the payment processing system 140 may be performed by the OCR application 115, the OCR system 140, or another party.

In block 205 and 210, the OCR application 115 obtains a digital scan of a card and isolates multiple images of the card as described herein in blocks 205 and 210 of FIG. 2.

In block 615, the OCR application 115 models the images of the card in 3D space to capture embossed digits and holographic images on the card 102. The OCR application 115 may combine, merge, blend, rotate, or otherwise manipulate the images to produce a 3D model of the card 102 in the images. The 3D model allows the view of the images to be realigned to different perspectives. The 3D model may be created by a digital manipulation of the images by the OCR application 115 or another computing device.

The 3D model allows the view of the images to be realigned to different perspectives. The 3D model may be rotated, zoomed, or in any suitable manner manipulated to allow the OCR application 115 to obtain different views of the card 102 in the model. The 3D model allows a system to view the embossed text and a hologram from different angles.

In block 620, the OCR application 115 transmits the 3D model to the payment processing system 140 to confirm that the card 102 being scanned is authentic. The OCR application 115 may transmit the 3D model via an Internet connection over the network, email, text, or in any suitable manner.

In block 625, the payment processing system 140 compares the 3D model to a database or other storage location. The payment processing system 140 may access images of the hologram or the embossed letters for a comparison to the transmitted 3D model. The payment processing system 140 may compare the 3D model to images related to the type of card 102 identified by the OCR application 115, by the user 101, by the payment processing system server 144, or by any suitable party. For example, the OCR application 115 may transmit data identifying the card 102 as a credit card associated with a particular issuer at the time the 3D model is transmitted. In another example, the payment processing system 140 identifies the type of card from the 3D model and uses images associated with the card type in the database for a comparison.

The payment processing system 140 may compare the 3D model to the images in the database in any suitable manner to confirm that the 3D model matches the standard. The standard to be matched is the appearance of the embossed digits and the hologram on card 102 from various perspectives as provided by the stored images. The standard may be a stored 3D model of the card 102. In an example, the payment processing system 140 accesses the stored images of the card type from particular perspectives. The payment processing system 140 shifts or rotates the 3D model to obtain perspectives of the 3D model that match the perspectives of the images from the database. The payment processing system 140 compares the images to the varying perspectives of the 3D model.

In an example, the payment processing system 140 may determine whether some or all of the digits are embossed. If the user 101 were submitting a fraudulent image, such as a flat photocopy of a card, the digits may not appear as embossed. The payment processing system 140 may additionally determine if the proper sets of digits are embossed. In another example, the payment processing system 140 may determine if the image presented by the hologram at a particular perspective matches the image of the hologram at that perspective in the stored image. As a hologram image changes as the perspective changes, the payment processing system 140 may determine if the hologram matches at multiple perspectives.

In block 630, the payment processing system 140 determines if the 3D model matches the standard. If the 3D model matches the standard, then the method 600 follows the "YES" branch of block 630 to block 635. If the 3D model does not match the standard, then the method 600 follows the "NO" branch to block 640.

Following the NO branch to block 640, the payment processing system 140 requests a revision of the 3D model of the card or the payment processing system 140 rejects the card 102. The payment processing system 140 may request that the OCR application 115 incorporate additional images be added into the 3D model. Alternatively, the payment processing system 140 may request that the OCR application 115 create a new 3D model. Any suitable manner of producing a new 3D image may be employed. Alternatively, the OCR application 115 may reject the authentication request and transmit the rejection to the OCR application 115 or other requestor.

The OCR application 115 may create a new 3D model and transmit the new 3D model to the payment processing system 140 as described in blocks 615 and 620.

The payment processing system 140 may compare the hologram and embossed text to the standard as described in 625 and 630. The method 600 may be repeated as many times as necessary to obtain a 3D model that matches the standard. Alternatively, the payment processing system 140 may attempt the comparison for a configured number of attempts and then provide a rejection if a match is not obtained.

Following the YES branch of block 630 to block 635, the payment processing system 140 supplies a verification of the card information to a requestor of the verification. The requestor may be the payment processing system 140, the OCR application 115, a merchant system, or any other suitable requestor.

In certain situations, the OCR application 115 or other computing device performs one or more of the methods herein and is unable to produce verified card information. The OCR application 115 may desire to improve the OCR algorithm or other process described herein. The OCR application 115 may desire to transmit the failed information to a provider of the OCR algorithm, the provider of the OCR application 115, the OCR system 120, or any suitable party. The failed information would be transmitted to allow the receiver to determine the caused of the unverified data and improve the algorithm or process.

For example, the image data from the camera 114 may not be interpreted correctly. In another example, the font of the card 102 is not recognized. In another example, the information of the card 102 may be in an unexpected format. In another example, the card issuer may have changed the associated IIN numbers. Any suitable reason for a failed OCR process may be a reason to provide the data to the requestor.

The OCR application 115 may prefer not to transmit the entire image to protect the privacy of the user 101. For example, if the OCR application 115 was unable to recognize the issuer 170 of a credit card of the user 101, the privacy of the user 101 may be compromised if the entire credit card image is transferred to the provider of the OCR algorithm. In another example, if the OCR application 115 was unable to recognize the issue date of a license, the user 101 may prefer that an image of the entire license not be transmitted over the Internet to an OCR system 120.

In an example embodiment, the OCR application 115 may send the unverified digits to the requestor of the failure. For example, the OCR application 115 may crop out the failing digits and transmit only the failing digits to the requestor. By sending only the cropped image, and not the entire image, the privacy of the user 101 is protected.

In another example embodiment, the user 101 provides a correction to a digit. For example, after failing to achieve a verified digit, the OCR application 115 provides an opportunity to correct a digit. In another example, the verified data from a card 102 is provided to the user 101 for verification on a user interface. For example, the OCR application 115 provides the extracted information on a screen of a smartphone for the user 101 to approve or correct.

If the user provides a correction to the data, the OCR application may provide the incorrect extraction, the corrected information, and a cropped portion of the image to the requestor. The entirety of the data and the full image are not transmitted to the requestor to protect the privacy of the user 101 and the data.

Other Example Embodiments

FIG. 4 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain example embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to compare extracted card data using continuous scanning, comprising:

receiving, by one or more computing devices, a digital scan of a card from a camera;

obtaining, by one or more computing devices, a plurality of images of the card from the digital scan of the physical card;

creating, by one or more computing devices, a first three-dimensional model of the card that captures a hologram that is displayed on the card based upon a digital manipulation of the plurality of images;

comparing, by the one or more computing devices, the first three-dimensional model of the card displaying the hologram to a standard three-dimensional model of the card depicting the hologram on the card;

determining, by the one or more computing devices, that perspectives of the first three-dimensional model of the hologram match the standard model of the hologram; and verifying, by the one or more computing devices, the first three-dimensional model based on the determination that the perspectives of the first three-dimensional model of the hologram match the standard model of the hologram.

2. The method of claim 1, further comprising:
accessing, by the one or more computing devices, at least one additional digital image of the card based on a determination by the one or more computing devices that the three-dimensional model of the hologram does not match the standard model of the hologram;
creating, by one or more computing devices, a second three-dimensional model of the card that captures the hologram based upon the additional images and at least a portion of the plurality of images;
comparing, by the one or more computing devices, the second three-dimensional model of the hologram to the standard three-dimensional model of the hologram;
determining, by the one or more computing devices, if the perspectives of the second three-dimensional model of the hologram match the standard three-dimensional model of the hologram; and
verifying, by the one or more computing devices, the second three-dimensional model when the perspectives of the second three-dimensional model of the hologram match the standard three-dimensional model of the hologram.

3. The method of claim 2, wherein the one or more computing devices receive the at least one additional image from the obtained plurality of images.

4. The method of claim 2, wherein the one or more computing devices receives the at least one additional image via a second scan of the card by the camera.

5. The method of claim 1, wherein the digital scan is received from a camera.

6. The method of claim 1, wherein the digital scan comprises a video or a plurality of still images.

7. The method of claim 1, wherein the card is a credit card, a debit card, an identification card, a loyalty card, an access card, or a stored value card.

8. A computer program product, comprising:
a non-transitory computer-readable storage device having computer-executable program instructions embodied thereon that when executed by a computer cause the computer to compare extracted card data using continuous scanning, the computer-executable program instructions comprising:
computer-executable program instructions to receive a digital scan of a card;
computer-executable program instructions to obtain a plurality of images of the card from the digital scan of the physical card;
computer-executable program instructions to create a first three-dimensional model of the card that captures a hologram that is displayed on the card based upon a digital manipulation of the plurality of images;
computer-executable program instructions to compare the first three-dimensional model of the card displaying the hologram to a standard three-dimensional model of the card depicting the hologram on the card;
computer-executable program instructions to determine that perspectives of the first three-dimensional model of the hologram match the standard model of the hologram; and
computer-executable program instructions to verify the first three-dimensional model based on the determination that the perspectives of the first three-dimensional model of the hologram match the standard model of the hologram.

9. The computer program product of claim 8, the computer program further comprising:
computer-executable program instructions to access at least one additional digital image of the card;
computer-executable program instructions to create a second three-dimensional model of the card that captures the hologram based upon the additional images and at least a portion of the plurality of images;
computer-executable program instructions to compare the second three-dimensional model of the hologram to the standard three-dimensional model of the hologram; and
computer-executable program instructions to determine if the perspectives of the second three-dimensional model of the hologram match the standard three-dimensional model of the hologram.

10. The computer program product of claim 8, wherein the computer receives the at least one additional image from the obtained plurality of obtained images.

11. The computer program product of claim 8, wherein the computer receives the at least one additional image via a second scan of the card.

12. The computer program product of claim 8, wherein the digital scan is received from a camera.

13. The computer program product of claim 8, wherein the digital scan comprises a video or a plurality of still images.

14. A system to compare extracted card data, the system comprising:
a storage resource;
a processor communicatively coupled to the storage resource, wherein the processor is configured to execute computer-readable instructions that are stored in the storage resource and that cause the system to:
receive a digital scan of a card;
obtain a plurality of images of the card from the digital scan of the physical card;
create a first three-dimensional model of the card that captures a hologram that is displayed on the card based upon a digital manipulation of the plurality of images
compare the first three-dimensional model of the card displaying the hologram to a standard three-dimensional model of the card depicting the hologram on the card; and
determine that perspectives of the first three-dimensional model of the hologram match the standard model of the hologram.

15. The system of claim 14, the computer-readable instructions being configured to further cause the system to:
access at least one additional digital image of the card;
create a second three-dimensional model of the card that captures the hologram based upon the additional images and at least a portion of the plurality of images;
compare the second three-dimensional model of the hologram to the standard three-dimensional model of the hologram; and
determine if the perspectives of the second three-dimensional model of the hologram match the standard three-dimensional model of the hologram.

16. The system of claim 15, wherein the at least one additional image is accessed from the obtained images.

17. The system of claim 14, wherein the card is a credit card, a debit card, an identification card, a loyalty card, an access card, or a stored value card.

* * * * *